United States Patent
Gill et al.

(10) Patent No.: US 7,186,470 B2
(45) Date of Patent: Mar. 6, 2007

(54) USE OF GREATER THAN ABOUT 15 ANGSTROM THICK COUPLING LAYER IN AP-TAB MAGNETIC HEAD

(75) Inventors: Hardayal Singh Gill, Palo Alto, CA (US); Stefan Maat, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 232 days.

(21) Appl. No.: 10/777,830

(22) Filed: Feb. 11, 2004

(65) Prior Publication Data

US 2005/0174691 A1   Aug. 11, 2005

(51) Int. Cl.
    *G11B 5/127*   (2006.01)
(52) U.S. Cl. ............... 428/811.5; 428/816; 360/324.12
(58) Field of Classification Search ............... None
    See application file for complete search history.

(56) References Cited

U.S. PATENT DOCUMENTS

| | | | |
|---|---|---|---|
| 6,040,961 A | 3/2000 | Gill ........................... 360/113 |
| 6,208,492 B1 | 3/2001 | Pinarbasi ............... 360/324.11 |
| 6,219,211 B1 | 4/2001 | Gill ........................ 360/324.11 |
| 6,455,178 B1 * | 9/2002 | Fuke et al. .............. 428/811.2 |
| 6,462,919 B1 * | 10/2002 | Mack et al. ............. 360/327.3 |
| 6,580,587 B1 | 6/2003 | Everitt ....................... 360/324 |
| 6,591,481 B2 | 7/2003 | Shimazawa et al. ..... 29/603.18 |
| 6,982,855 B2 * | 1/2006 | Shimazawa et al. ... 360/324.12 |
| 7,010,848 B2 * | 3/2006 | Li et al. ................... 29/603.14 |
| 7,075,759 B2 * | 7/2006 | Hasegawa et al. ..... 360/324.12 |
| 7,079,362 B2 * | 7/2006 | Hasegawa .............. 360/324.12 |
| 7,092,218 B2 * | 8/2006 | Hasegawa et al. .......... 360/321 |
| 2002/0196590 A1 | 12/2002 | Saito et al. ............ 360/324.11 |
| 2003/0011947 A1 | 1/2003 | Saito et al. ............ 360/324.11 |
| 2003/0011948 A1 | 1/2003 | Saito et al. ............ 360/324.11 |
| 2003/0058587 A1 | 3/2003 | Hasegawa et al. ..... 360/324.12 |
| 2004/0013880 A1 * | 1/2004 | Daughton et al. ........ 428/411.1 |
| 2004/0072021 A1 * | 4/2004 | Hasegawa et al. .......... 428/692 |
| 2006/0061918 A1 * | 3/2006 | Li et al. ................ 360/324.12 |

OTHER PUBLICATIONS

Parkin (Phys. Rev. Let., 67(25), 1991, 3598-3601).*
Oscillatory interlayer exchange coupling in Co/Ru multilayers and bilayers (Bloemen, P., Kesteren, H., Swagten, H., and de Jonge, W., Phys. Rev. B, 1994, 50(18), 13-505-13-515).*

* cited by examiner

*Primary Examiner*—Kevin M. Bernatz
(74) *Attorney, Agent, or Firm*—Zilka-Kotab, PC

(57) ABSTRACT

A magnetic head that uses a thick AP coupling layer in an AP-tab structure. The head includes a free layer having an active area and tab regions on opposite sides of the active area. An antiparallel (AP) coupling layer is formed above the free layer. In one embodiment, the AP coupling layer has a thickness of 15 Å or more. In another embodiment, the AP coupling layer is formed of Ir, and preferably has a thickness of 15 Å or more. A bias layer is formed above each of the tab portions of the free layer, magnetic moments of the tab regions of the free layer being pinned antiparallel to the magnetic moments of the bias layers.

22 Claims, 9 Drawing Sheets

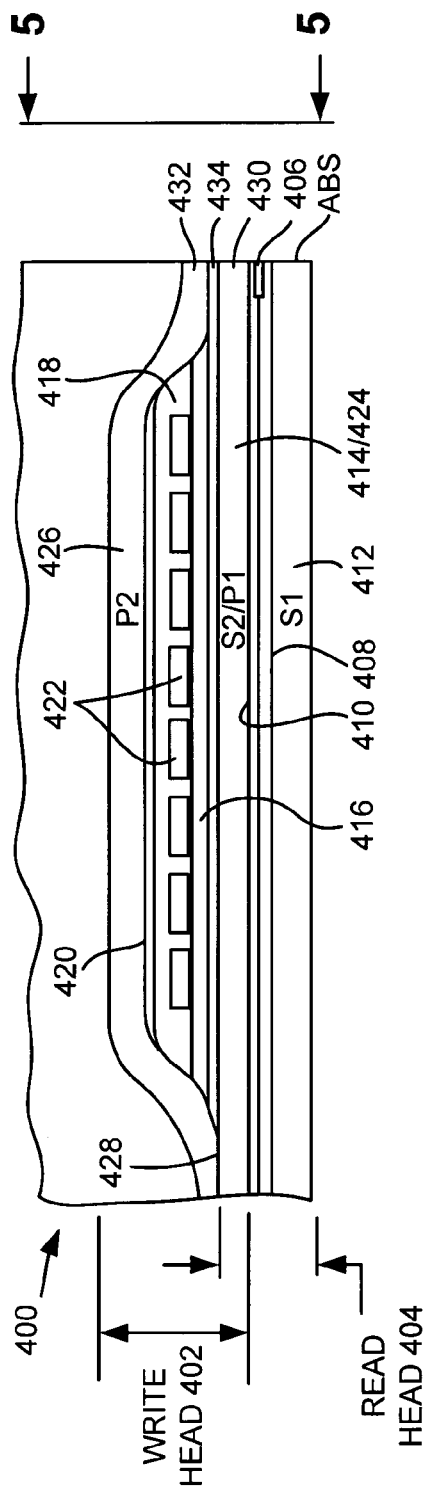
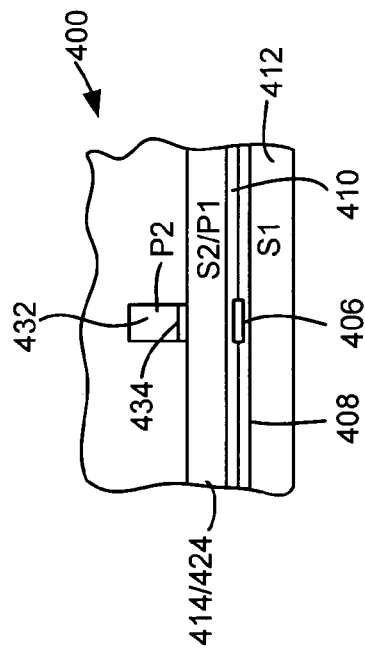
FIG. 4
FIG. 5

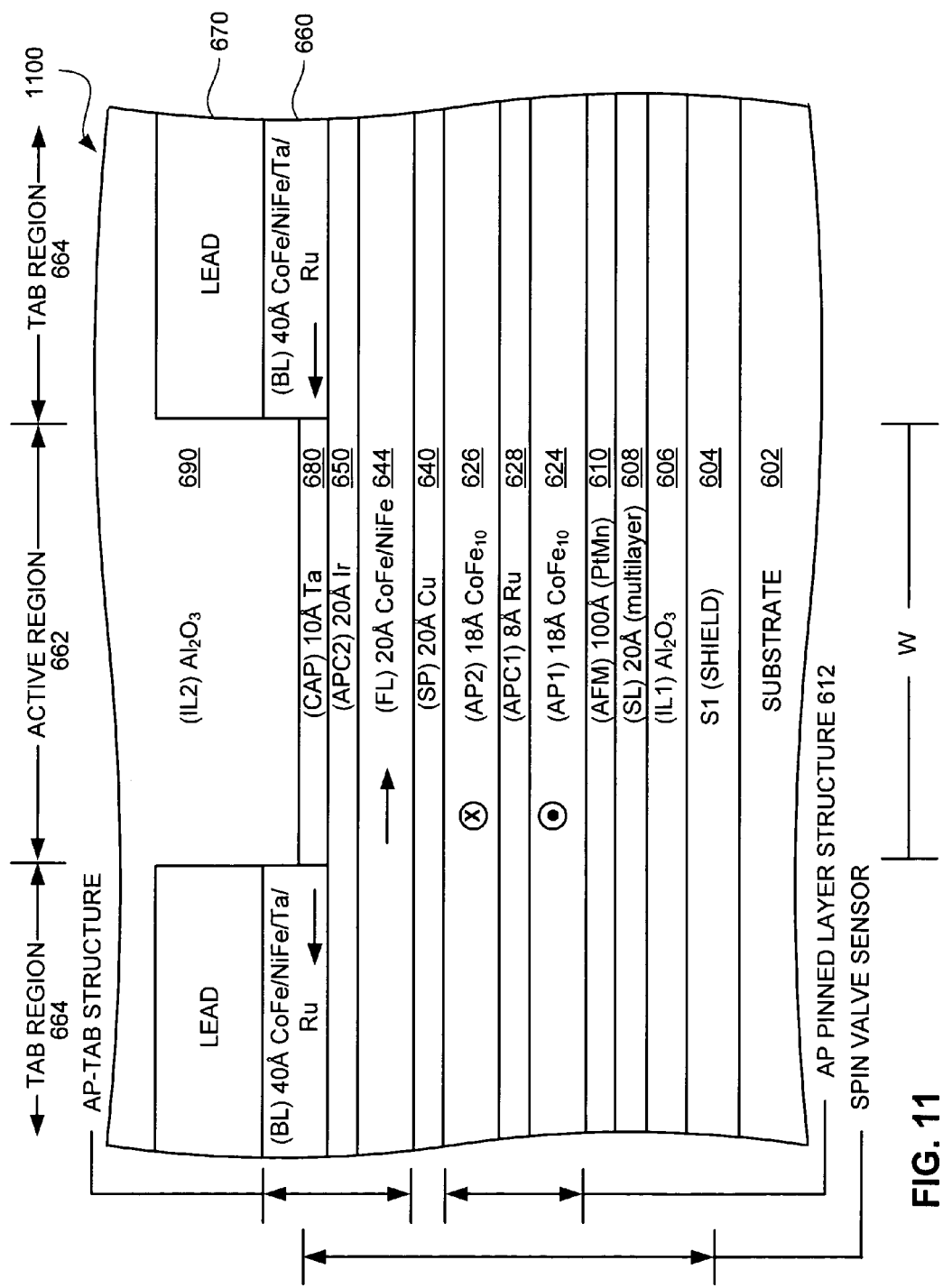

US 7,186,470 B2

USE OF GREATER THAN ABOUT 15 ANGSTROM THICK COUPLING LAYER IN AP-TAB MAGNETIC HEAD

FIELD OF THE INVENTION

The present invention relates to magnetic heads, and more particularly, this invention relates to read heads having magnetically pinned tab regions.

BACKGROUND OF THE INVENTION

One well known way to increase the performance of hard disk drives is to increase the areal data storage density of the magnetic hard disk. This can be accomplished by reducing the written data track width, such that more tracks per inch can be written on the disk. To read data from a disk with a reduced track width, it is also necessary to develop sufficiently narrow read head components, such that unwanted magnetic field interference from adjacent data tracks is substantially eliminated.

The standard prior art read head elements include a plurality of thin film layers that are deposited and fabricated to produce a GMR read head, as is known to those skilled in the art. Significantly, where the width of the thin film layers that comprise the GMR read head is reduced below certain values, the magnetic properties of the layers are substantially compromised. To overcome this problem, GMR read heads have been developed in which the thin film layers have an ample width, and bias layers and electrical leads are overlaid on top of outer "tab" regions of the thin film layers. This lead overlaid configuration has the effect of creating an active read head region having a width that is less than the entire width of the deposited layers, such that the magnetic properties of the thin film layers can be preserved. Thus, in the lead overlaid GMR read heads of the prior art, active magnetic layer portions exist between the electrical leads and passive magnetic layer portions exist beneath the electrical leads.

FIG. 1 is a side cross-sectional view of a prior art electrical lead overlaid read head portion of a magnetic head 100. As depicted therein, the prior art lead overlaid read head generally includes a substrate base 102 that constitutes the material from which the magnetic head is fabricated, such as aluminum titanium carbide. A first magnetic shield 104 is fabricated on the substrate, and an insulation layer 106, typically composed of aluminum oxide, is fabricated upon the magnetic shield 104. A seed layer 108 is deposited upon the insulation layer 106 and a series of thin film layers are sequentially deposited upon the seed layer 108 to form a GMR read head. In this structure, the layers generally include an antiferromagnetic layer 114, a pinned magnetic layer 118 that is deposited upon the anti ferromagnetic layer 114, a spacer layer 122 that is deposited upon the pinned magnetic layer 118, a free magnetic layer 126 that is deposited upon the spacer layer 122 and a cap layer 130 that is deposited upon the free magnetic layer 126. Typically, the antiferromagnetic layer 114 may be composed of PtMn, NiMn or IrMn, the pinned magnetic layer 118 may be composed of CoFe, the spacer layer 122 may be composed of Cu, the free magnetic layer 126 may be composed of CoFe and the cap layer 130 may be composed of Ta.

Following the deposition of the GMR read head layers 114–130, a patterned etching process is conducted such that only central regions 140 of the layers 114–130 remain. Thereafter, hard bias elements 148 are deposited on each side of the central regions 140. Following the deposition of the hard bias elements 148, electrical lead elements 154 are fabricated on top of the hard bias elements 148. As depicted in FIG. 2, inner ends 156 of the leads 154 are overlaid on top of tab regions 160 of the layers 114–130 of the central read head layer regions 140. A second insulation layer 164 is fabricated on top of the electrical leads 154 and cap layer 130, followed by the fabrication of a second magnetic shield (not shown) and further components that are well known to those skilled in the art for fabricating a complete magnetic head.

A significant feature of the prior art lead overlaid GMR read head depicted in FIG. 1 is that the portion of the central layer region 140 which substantially defines the track reading width W of the read head 100 is the central portion 144 of the read head layer regions 140 that is disposed between the inner ends 156 of the electrical leads 154. That is, because the electrical current flows through the read head layers between the electrical leads 154, the active portion 144 of the read head layers comprises the width w between the inner ends 156 of the electrical leads 154. The tab regions 160 of the read head layers disposed beneath the overlaid inner ends 156 of the electrical leads 154 are somewhat passive in that only a small amount of electrical current passes through them between the electrical leads 154.

A problem that has been recognized with regard to such prior art lead overlaid read heads is that the passive region of the magnetic layers of the read head, and particularly the free magnetic layer, is not entirely passive. That is, external magnetic fields, such as from adjacent data tracks, create magnetic field fluctuation and noise within the passive regions of the free magnetic layer beneath the electrical leads. Thus, noise and side reading effects continue to be a problem with lead overlaid GMR read heads.

Further, such prior art heads require hard bias material on either side of the sensor to exert magnetic force on the free layer to magnetically stabilize the free layer. The problem is that hard bias layers are very thick, and as track sizes shrink, sensors must get smaller. When the track width becomes very narrow, the hard bias layers make the free layer very insensitive and thus less effective. What is needed is a way to create a sensor with a narrow track width, yet with a free layer that is very sensitive.

To overcome the problems described above, designers have turned to providing in-stack bias layers in the tab regions. FIG. 2 depicts another prior art lead overlaid read head 200 having a structure similar to that of FIG. 1. As depicted in FIG. 2, the read head 200 includes a GMR read head thin film element 140, but does not include the hard bias elements, which have been replaced by an insulating material. Instead, this read head 200 includes bias layers 202 that are formed above the tab regions 160, such that an inner portion 204 of the layer 202 extends over the tab regions 160 of the layers that comprise the read head element 140. The bias layer 202 is deposited full film on top of an antiparallel (AP) coupling layer 206, the AP coupling layer providing antiparallel coupling between the bias layer 202 and the free layer 126. The AP coupling layer 206 is formed of Ru having a thickness of about 8 Å. The electrical leads 154 are thereafter fabricated on top of the bias layer 202. Then the portions of the leads 154 and bias layer 202 overlying the central portion 144 of the read head 200 are removed such as by etching (e.g., ion beam etching) or milling.

Because the inner portion 204 of the bias layer 202 are present only above the tab regions 160 of the AP coupling layer 206, which is deposited above the tab regions 160 of the free layer 126, the magnetic field within the inner portion 204 of the bias layers 202 will become magnetostatically coupled to the tab regions 160 of the free layer 126 through the AP coupling layer 206. This provides a pinning effect upon the magnetic fields within the tab regions 160 of the free layer 126, making the free layer 126 active only in the active area 144 and passive in the tab regions 160. The resulting structure is known as an AP-tab design.

A problem that has been recognized with regard to prior art lead overlaid read heads such as the head 200 shown in FIG. 2 is that during removal of the bias layer 202 from above the active region 144, the etching or milling can mill through the thin (8 Å) Ru AP coupling layer 206, resulting in damage to the underlying free layer 126. This damage in turn results in problems such as reading errors and instability. Also, it is desirable to avoid oxidation of the free layer 126. Removal of portions of the Ru coupling layer 206 exposes portions of the free layer 126, making it susceptible to corrosion.

What is therefore needed is a new structure that provides a thicker AP coupling layer that provides more protection to the underlying free layer during removal of the bias layer from the active portion of the read head.

SUMMARY OF THE INVENTION

The present invention overcomes the drawbacks and limitations described above by providing a magnetic head that uses a thick AP coupling layer in an AP-tab structure. Accordingly, the head includes a free layer having an active area and tab regions on opposite sides of the active area. An antiparallel (AP) coupling layer is formed above the free layer. In one embodiment, the AP coupling layer has a thickness of 15 Å or more. In another embodiment, the AP coupling layer is formed of Ir, and preferably has a thickness of 15 Å or more. A bias layer is formed above each of the tab portions of the free layer, magnetic moments of the tab regions of the free layer being pinned antiparallel to the magnetic moments of the bias layers. The bias layers can be formed of NiFe, CoFe, Ta, Ru and laminates thereof.

Preferably, the AP coupling layer has a coupling strength of at least about 0.5 erg/cm$^2$. In an embodiment, the head may further include an AP pinned layer structure below the free layer, the AP pinned layer structure including at least two pinned layers having magnetic moments that are self-pinned antiparallel to each other, the pinned layers being separated by another AP coupling layer. In a preferred embodiment, the pinned layers of the AP pinned layer structure are formed of CoFe.

The free layer is preferably formed on a layer of Cu or NiFe, which act as an underlayer to the AP tab structure and provide improved AP coupling and thermal stability.

Other aspects and advantages of the present invention will become apparent from the following detailed description, which, when taken in conjunction with the drawings, illustrate by way of example the principles of the invention.

BRIEF DESCRIPTION OF THE DRAWINGS

For a filler understanding of the nature and advantages of the present invention, as well as the preferred mode of use, reference should be made to the following detailed description read in conjunction with the accompanying drawings.

FIG. 4 is a partial view of the slider and a merged magnetic head.

FIG. 5 is a partial ABS view, not to scale, of the slider taken along plane 5—5 of FIG. 4 to show the read and write elements of the merged magnetic head.

FIG. 11 is a side cross-sectional view of a fourth preferred embodiment of a lead overlaid read head portion of a magnetic head of the present invention.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 1:
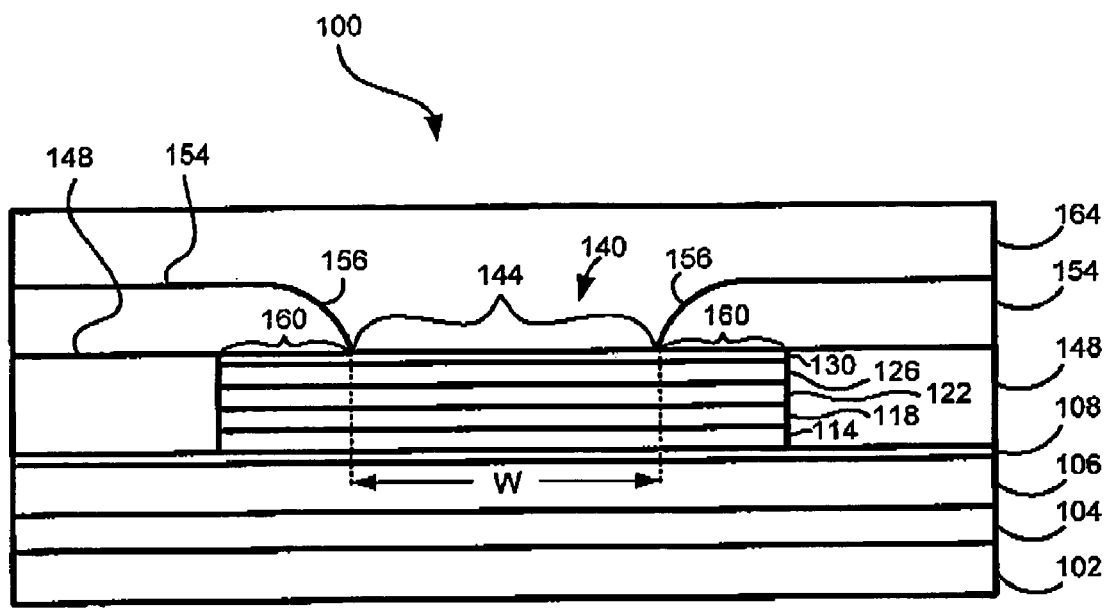
FIG. 1 is a side cross-sectional view of a prior art lead overlaid read head portion of a magnetic head.
Figure 2:
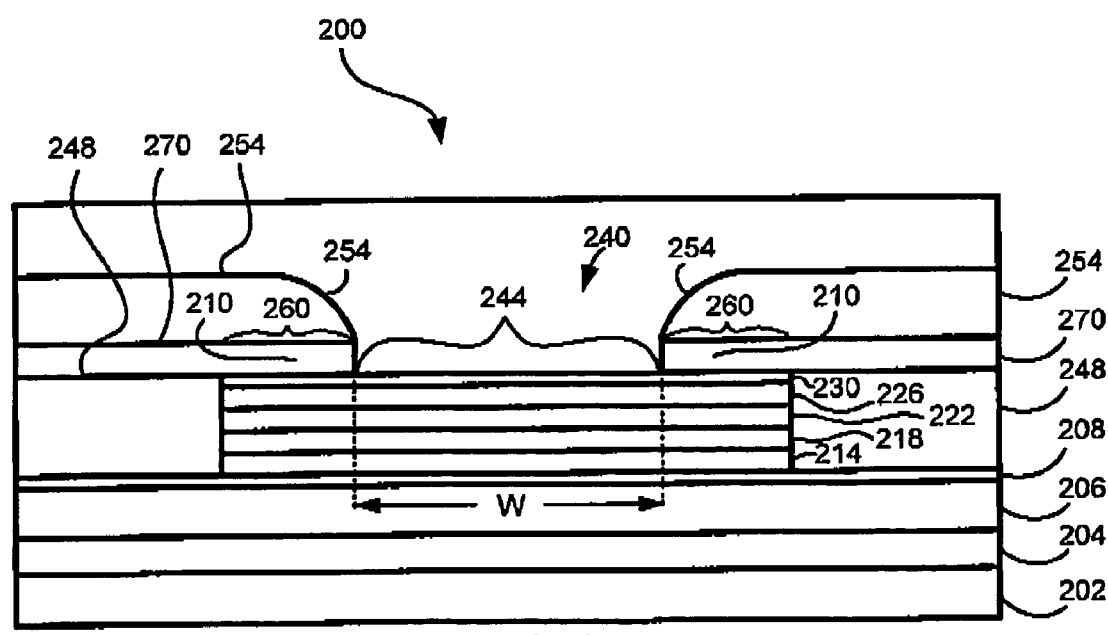
FIG. 2 is a side cross-sectional view of another prior art lead overlaid read head portion of a magnetic head.
Figure 3:
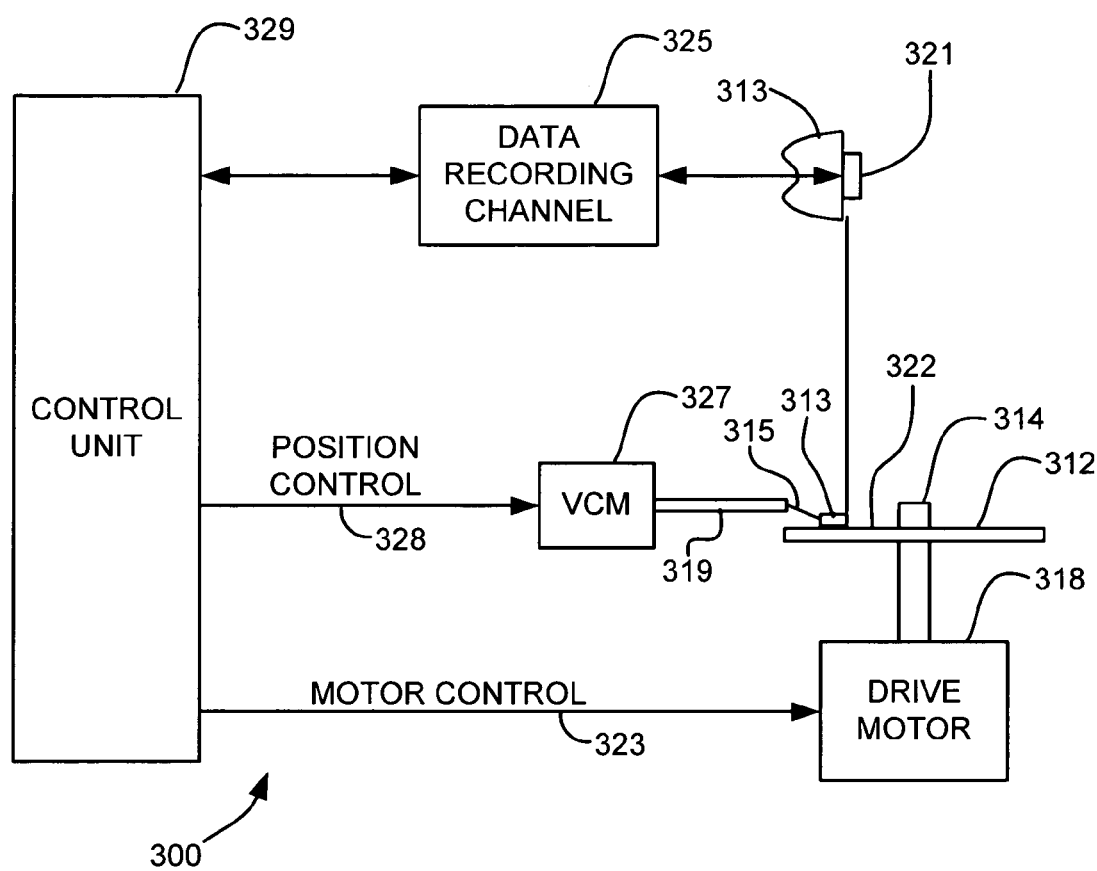
FIG. 3 is a perspective drawing of a magnetic disk drive system in accordance with one embodiment.

Referring now to FIG. 3, there is shown a disk drive 300 embodying the present invention. As shown in FIG. 3, at least one rotatable magnetic disk 312 is supported on a spindle 314 and rotated by a disk drive motor 318. The magnetic recording on each disk is in the form of an annular pattern of concentric data tracks (not shown) on the disk 312.

At least one slider 313 is positioned near the disk 312, each slider 313 supporting one or more magnetic read/write heads 321. More information regarding such heads 321 will be set forth hereinafter during reference to FIG. 4. As the disks rotate, slider 313 is moved radially in and out over disk surface 322 so that heads 321 may access different tracks of the disk where desired data are recorded. Each slider 313 is attached to an actuator arm 319 by means way of a suspension 315. The suspension 315 provides a slight spring force which biases slider 313 against the disk surface 322. Each actuator arm 319 is attached to an actuator means 327. The actuator means 327 as shown in FIG. 3 may be a voice coil motor (VCM). The VCM comprises a coil movable within a fixed magnetic field, the direction and speed of the coil movements being controlled by the motor current signals supplied by controller 329.

During operation of the disk storage system, the rotation of disk 312 generates an air bearing between slider 313 and disk surface 322 which exerts an upward force or lift on the slider. The air bearing thus counter-balances the slight spring force of suspension 315 and supports slider 313 off and slightly above the disk surface by a small, substantially constant spacing during normal operation.

The various components of the disk storage system are controlled in operation by control signals generated by control unit 329, such as access control signals and internal clock signals. Typically, control unit 329 comprises logic control circuits, storage means and a microprocessor. The control unit 329 generates control signals to control various system operations such as drive motor control signals on line 323 and head position and seek control signals on line 328. The control signals on line 328 provide the desired current profiles to optimally move and position slider 313 to the desired data track on disk 312. Read and write signals are communicated to and from read/write heads 321 by way of recording channel 325.

The above description of a typical magnetic disk storage system, and the accompanying illustration of FIG. 3 are for representation purposes only. It should be apparent that disk storage systems may contain a large number of disks and actuators, and each actuator may support a number of sliders.

FIG. 4 is a side cross-sectional elevation view of a merged magnetic head 400, which includes a write head portion 402 and a read head portion 404, the read head portion employing a spin valve sensor 406 of the present invention. FIG. 5 is an ABS view of FIG. 4. The spin valve sensor 406 is sandwiched between nonmagnetic electrically insulative first and second read gap layers 408 and 410, and the read gap layers are sandwiched between ferromagnetic first and second shield layers 412 and 414. In response to external magnetic fields, the resistance of the spin valve sensor 406 changes. A sense current ($I_s$) conducted through the sensor causes these resistance changes to be manifested as potential changes. These potential changes are then processed as readback signals by the processing circuitry 329 shown in FIG. 3.

The write head portion 402 of the magnetic head 400 includes a coil layer 422 sandwiched between first and second insulation layers 416 and 418. A third insulation layer 420 may be employed for planarizing the head to eliminate ripples in the second insulation layer caused by the coil layer 422. The first, second and third insulation layers are referred to in the art as an "insulation stack". The coil layer 422 and the first, second and third insulation layers 416, 418 and 420 are sandwiched between first and second pole piece layers 424 and 426. The first and second pole piece layers 424 and 426 are magnetically coupled at a back gap 428 and have first and second pole tips 430 and 432 which are separated by a write gap layer 434 at the ABS. Since the second shield layer 414 and the first pole piece layer 424 are a common layer this head is known as a merged head. In a piggyback head an insulation layer is located between a second shield layer and a first pole piece layer. First and second solder connections (not shown) connect leads (not shown) from the spin valve sensor 406 to leads (not shown) on the slider 313 (FIG. 3), and third and fourth solder connections (not shown) connect leads (not shown) from the coil 422 to leads (not shown) on the suspension.

Figure 6:
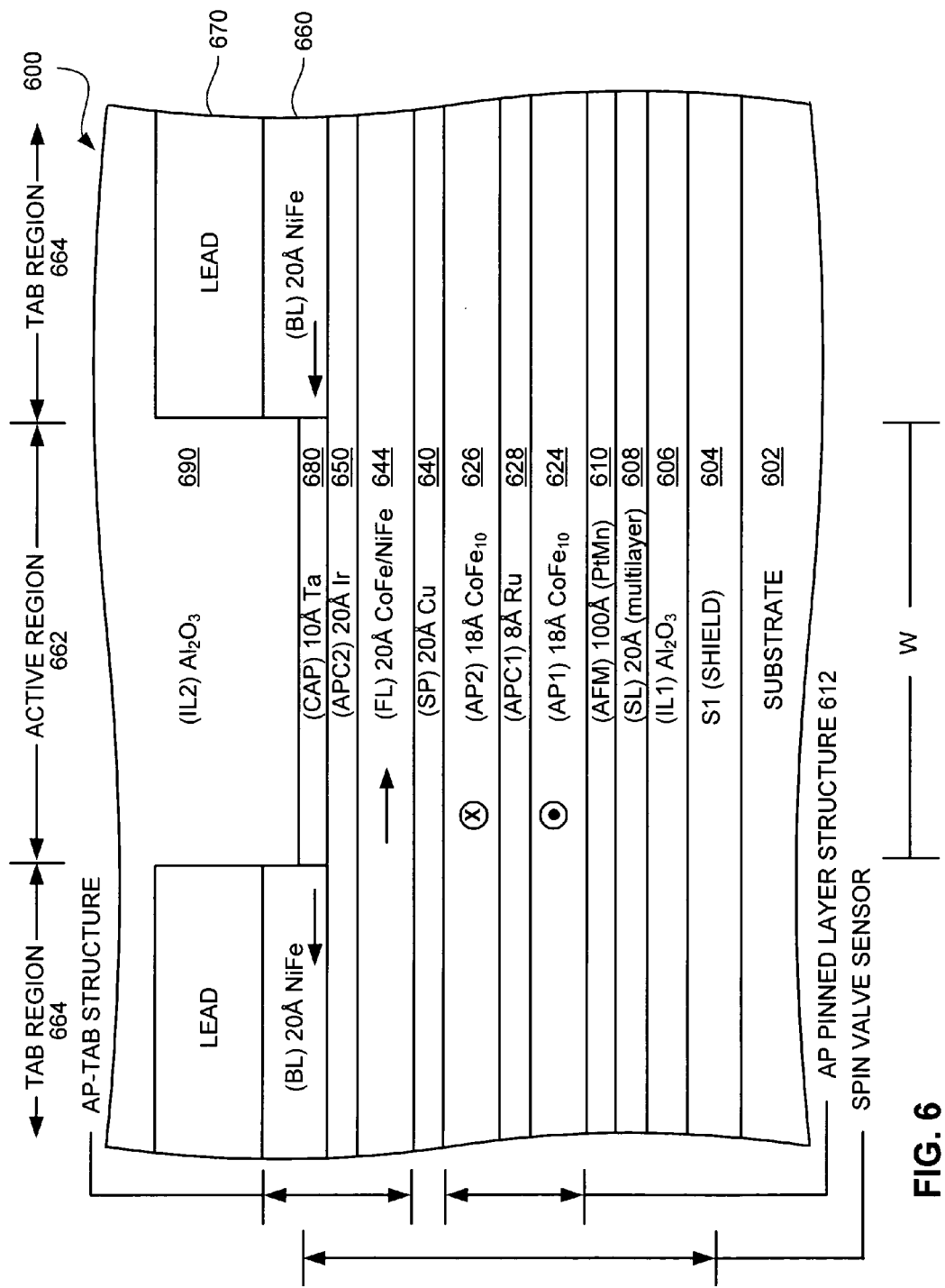
FIG. 6 is a side cross-sectional view of a first preferred embodiment of a lead overlaid read head portion of a magnetic head of the present invention.

FIG. 6 illustrates a lead overlaid read head 600 according to one preferred embodiment. As shown, the read head 600 includes a substrate base 602, a first magnetic shield (S1) 604 fabricated on the substrate, and an insulation layer (IL1) 606 fabricated upon the magnetic shield 604. Seed layers (SL) 608 are deposited upon the insulation layer 606 and a series of thin film layers are sequentially deposited upon the seed layers 608 to form a read head. The seed layers aid in creating the proper growth structure of the layers above them. Note that the materials used to form the seed layers can be varied, and will depend on the desired processing parameters.

Then an antiparallel (AP) pinned layer structure 612 is formed above the seed layers 608. As shown in FIG. 6, first and second AP pinned magnetic layers, (AP1) and (AP2) 624, 626, are separated by a thin layer (APC1) 628 of an antiparallel coupling material such that the magnetic moments of the AP pinned layers 624, 626 are self-pinned antiparallel to each other. The pinned layers 624, 626 have a property known as magnetostriction. The magnetostriction of the pinned layers 624, 626 is very positive. The head 600 is also under compressive stresses because of its geometry at the ABS, and the configuration of the layer is such that it produces very large compressive stress. The combination of positive magnetostriction and compressive stress causes the pinned layers 624, 626 to develop a magnetic anisotropy that is in a perpendicular direction to the track width. This magnetic coupling through the Ru spacer causes the pinned layers 624, 626 to have antiparallel-oriented magnetizations.

In the embodiment shown in FIG. 6, the preferred magnetic orientation of the pinned layers 624, 626 is for the first pinned layer 624, out of the face of the structure depicted (perpendicular to the ABS of the head 600), and into the face for the second pinned layer 626. Illustrative materials for the pinned layers 624, 626 are $CoFe_{10}$ (90% Co, 10% Fe), $CoFe_{50}$ (50% Co, 50% Fe), etc. separated by an antiparallel coupling layer 628 of Ru. Illustrative thicknesses of the first and second pinned layers 624, 626 are between about 10 Å and 25 Å. The Ru layer 628 can be about 5–15 Å, but is preferably selected to provide a saturation field above about 10 KOe. In a preferred embodiment, each of the pinned layers 624, 626 is about 18 Å with a Ru layer 628 therebetween of about 8 Å.

The AP pinned layer structure 612 can be stabilized by placement of an antiferromagnetic (AFM) layer 610 below the pinned layer structure 612. The AFM layer 610 pins the AP pinned layer structure 612 so that the pinned layers 624, 626 do not move around when disk is reading data from disk, upon application of external magnetic fields, etc. Note that the head may or may not include an AFM layer 610.

A spacer layer (SP) 640 is added above the AP pinned layer structure 612. The preferred material for forming the spacer layer 640 is Cu. The inventors have found that Cu improves the interfacial exchange of AP pinned layer structures containing Ir.

A free magnetic layer (FL) 644 is formed above the spacer layer 640. The free layer 644 may be composed of CoFe, NiFe, FeN, Co, etc. and laminates of such materials. A second AP coupling layer (APC2) 650 is formed above the free layer 644. A bias layer 660 is formed full film above the second AP coupling layer 650. The bias layer 660 may be formed of CoFe, NiFe, FeN, Co, etc. and laminates of these materials.

Whatever combination of materials is used, the magnetic moments of the free and bias layers 644, 660 should be antiparallel. This is achieved by using Iridium (Ir) for the second AP coupling layer 650, preferably at a thickness of about 15–30 Å, ideally about 20 Å if CoFe10 free and bias layers are used, and providing a coupling strength of greater than about 0.5 erg/cm$^2$. The benefits of using Ir as the second AP coupling layer 650 will be set forth in more detail below.

Then leads 670 are formed above the bias layer 660 in the tab regions 664 by any suitable process. Processes that can be used to form the leads 670 include additive and subtractive processes. One additive process includes a patterning process in which a lithography mask (not shown) is added to the wafer stack and conductive material is added to form the leads 670. Then the lithography mask is removed from the wafer stack, leaving a gap between the leads 670. According to a subtractive process, lead material is added to the wafer stack and material is removed from the lead material to define a gap above the active area 662 with leads 670 on opposite sides thereof. A preferred method for removing the lead material from the gap area is Reactive Ion Etching (RIE).

The portion of the bias layer 660 in the active area 662 is removed to eliminate its magnetic properties in the active area 662, thereby allowing the free layer 644 in the active area 662 to spin freely. This allows the head to read track widths in the sub-micron range. Further, each tab region (overlap area) 664 can be much longer than the active area 662 because the antiparallel coupling makes the overlap portions 664 insensitive.

A cap layer (CAP) 680 is deposited above the second AP coupling layer 650 in the active area 662. A preferred material for the cap layer 680 is Ta. A second insulation layer (IL2) 690 is fabricated on top of the electrical leads 670 and cap layer 680, followed by the fabrication of a second magnetic shield (not shown) and further components, such as a write portion, that are well known to those skilled in the art for fabricating a complete magnetic head.

The portion of the bias layer 660 in the active area 662 is removed down to the second AP coupling layer 650 by any suitable process. One process is ion beam etching or RIE. Another process is oxidation of the bias layer to make it magnetically dead. However, as mentioned above, a risk of etching or milling through the second AP coupling layer 650 and damaging the underlying free layer 644 exists. Any damage to the free layer 644 can result in an inoperable head, or a head that does not function as desired. Also, it is desirable to avoid oxidation of the free layer 644. Removal of portions of the second AP coupling layer 650 exposes portions of the free layer 644, making it susceptible to corrosion.

Figure 7:
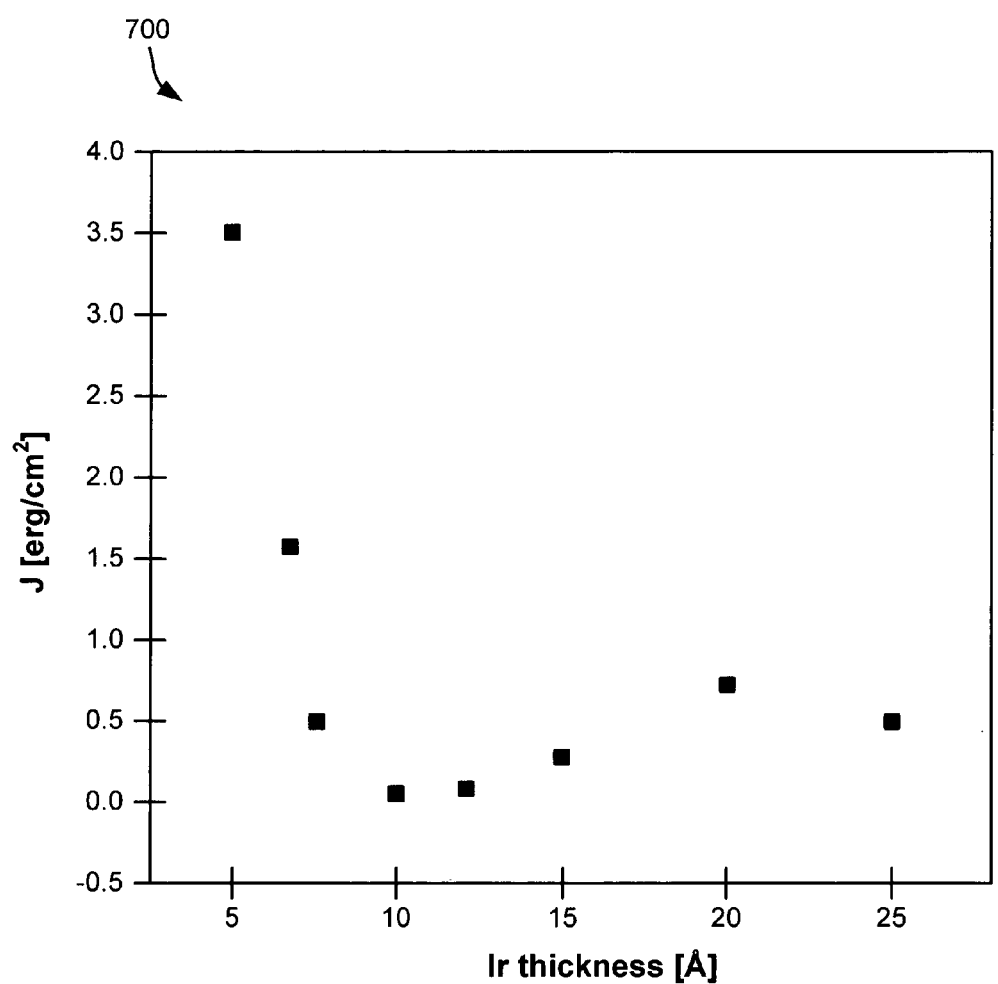
FIG. 7 is a chart 700 depicting the coupling strength of Ir in an AP pinned structure of CoFe/Ir/CoFe.

Iridium provides antiferromagnetic exchange coupling to $CoFe_{10}$ comparable to Ru, but at a much greater thickness, thereby providing more protection to the free layer 644. FIG. 7 is a chart 700 depicting the coupling strength of Ir in an AP pinned structure of $CoFe_{10}/Ir/CoFe_{10}$ grown onto a Ta/Cu underlayer. As shown, exchange coupling through Ir is best at about 20 Å Ir, where the Ir has a coupling coefficient (J) of between about 0.5 and 1 $erg/cm^2$. To get comparable coupling strength with Ru, e.g., J=0.8 $erg/cm^2$, the layer of Ru must be very thin, on the order of about 5–8 Å. At greater Ru thickness, the coupling decreases. For example, a Ru layer of 20 Å thickness provides very little antiparallel coupling.

Thus, the benefit of using Ir as the second AP coupling layer 650 is that the thicker Ir layer provides more protection to free layer 644 during processing. The larger margin of error results in higher yields and makes this type of design feasible. The phase of the oscillations in coupling strength will change with CoFe composition. Accordingly the Ir thickness at which strong antiferromagnetic coupling is obtained will change with CoFe composition. $CoFe_{10}$ is used for illustrating the general principles of the present invention and is not meant to limit the inventive concepts claimed herein. Other CoFe compositions may be used with an Ir thickness adjusted to a thickness where strong antiferromagnetic coupling is obtained. The preferred Ir thickness is 15 Å or more.

Figure 8:
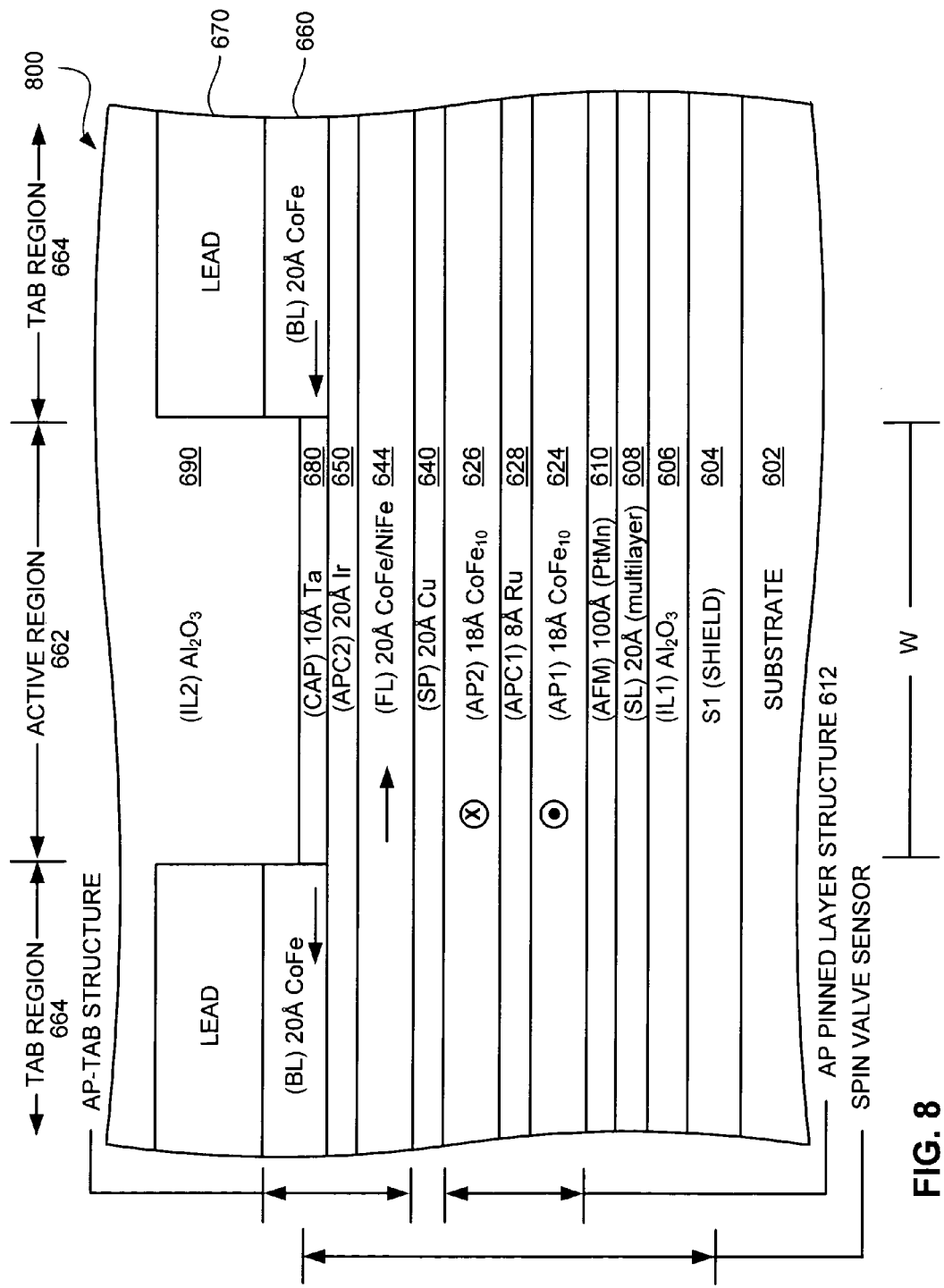
FIG. 8 is a side cross-sectional view of a second preferred embodiment of a lead overlaid read head portion of a magnetic head of the present invention.

FIG. 8 illustrates a lead overlaid read head 800 according to another embodiment. This head 800 is similar to the head 600 shown in FIG. 6, except that the bias layer 660 is formed of CoFe. In this embodiment, the Cu spacer layer 640 acts as an underlayer for formation of a CoFe/Ir/CoFe AP-tab structure. Underlayers are known to have an influence on crystalline growth direction and growth mode. CoFe is face centered cubic (fcc) as opposed to hexagonically closed packed (hcp) for Co, or body centered cubic (bcc) for Fe. The Cu underlayer as well as the Ir coupling layer are fcc. The inventors have found that the use of a Cu underlayer for formation of a CoFe/Ir/CoFe AP tab structure 612 results in increased interfacial exchange.

$NiFe_{80}$ is another good underlayer that shows improved thermal stability over Cu. Since $NiFe_{80}$ is magnetic it can be inserted in between the Cu spacer and the CoFe layer and act as part as an underlayer for CoFe as well as a part of the free layer. $NiFe_{80}$ is also fcc. Other fcc NiFe compositions may also be used.

Figure 9:
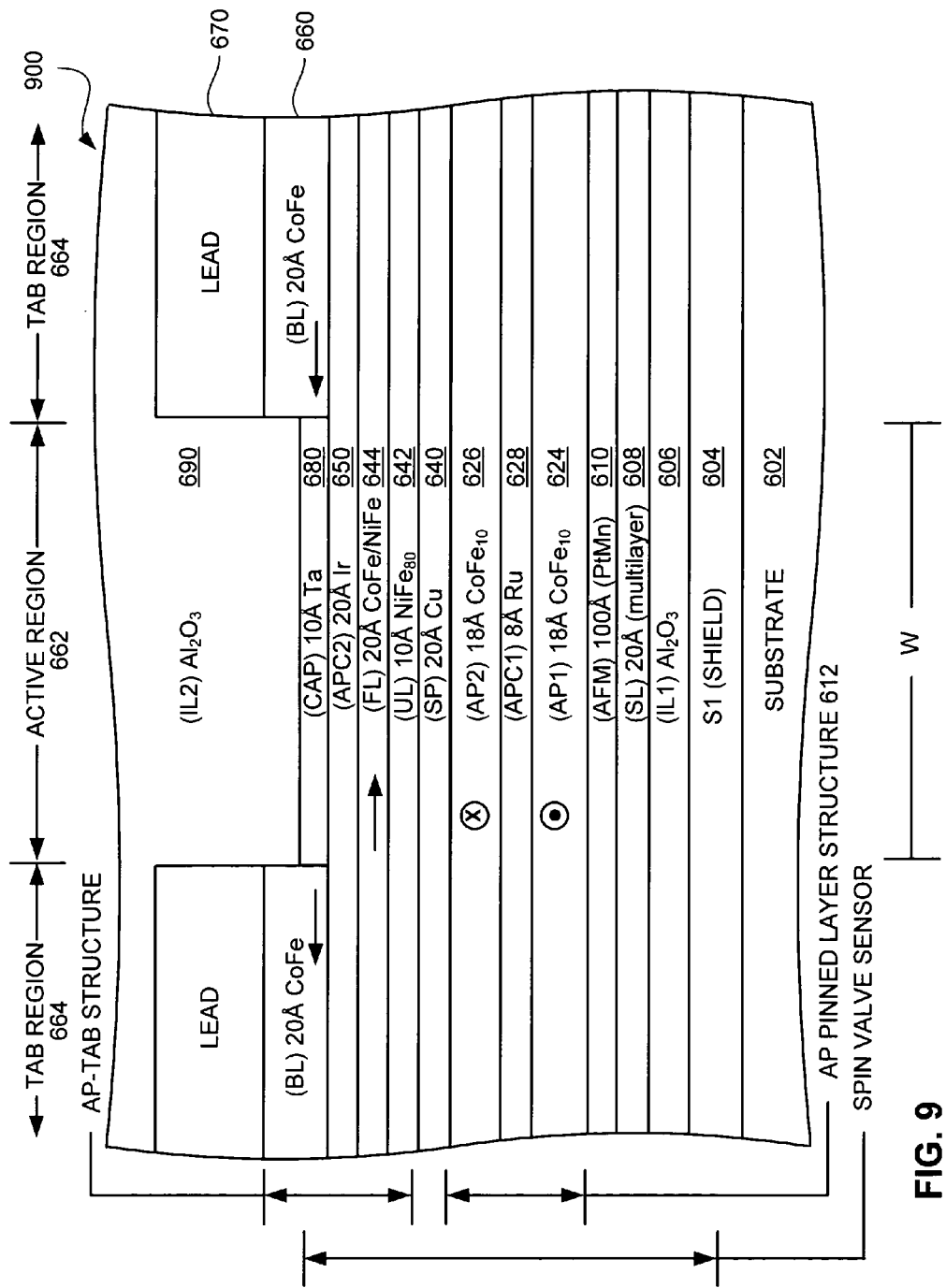
FIG. 9 is a side cross-sectional view of a third preferred embodiment of a lead overlaid read head portion of a magnetic head of the present invention.

FIG. 9 illustrates a head 900 that is similar to the head 800 shown in FIG. 8, except that a NiFe layer is inserted in between the Cu spacer 640 and the CoFe free layer 644. In this embodiment, the NiFe layer 642 acts as an underlayer (UL) for formation of a CoFe/Ir/CoFe AP-tab structure.

Figure 10:
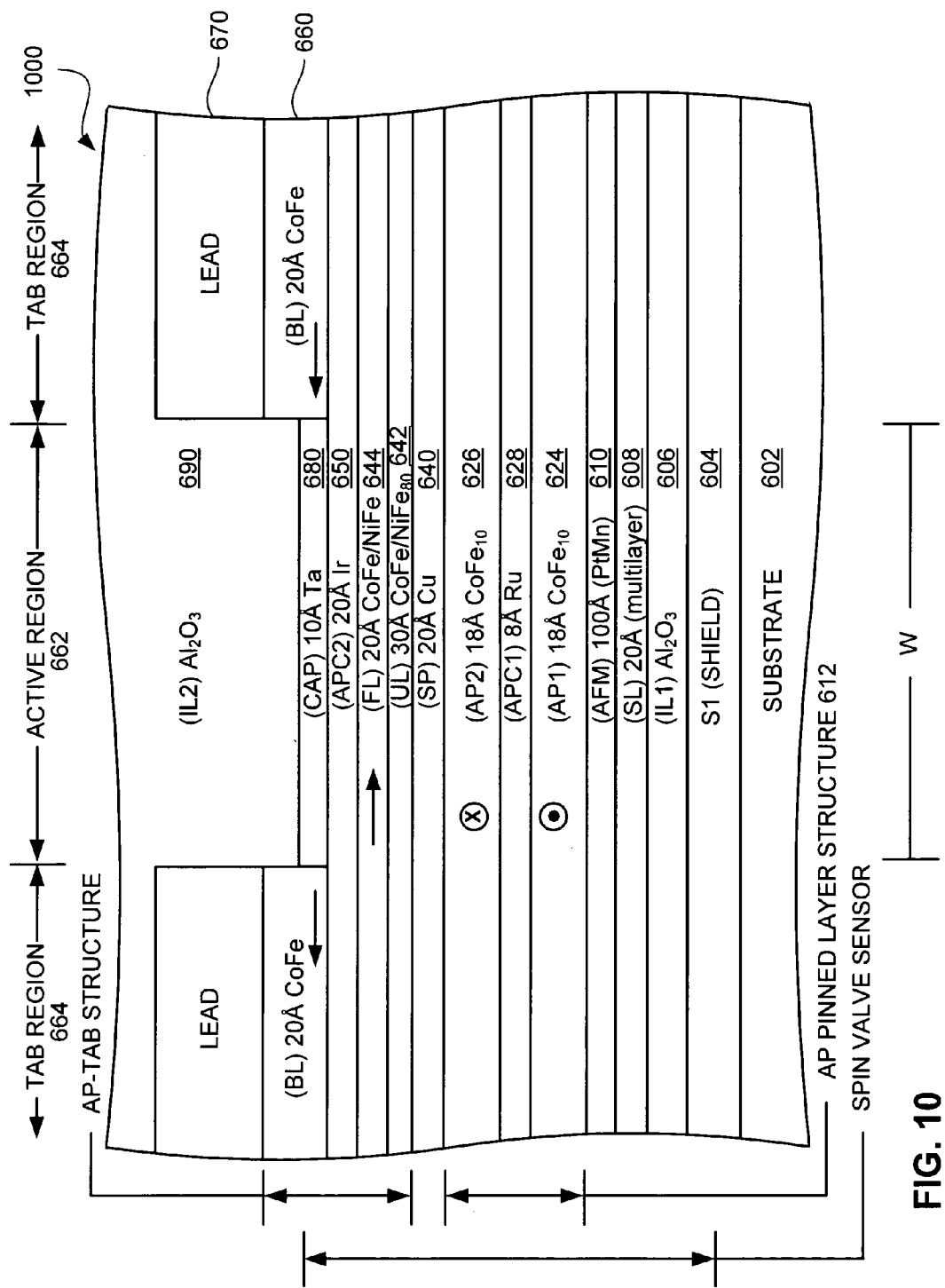
FIG. 10 is a side cross-sectional view of a fourth preferred embodiment of a lead overlaid read head portion of a magnetic head of the present invention.

FIG. 10 illustrates a head 1000 that is similar to the head 900 shown in FIG. 9, except that a CoFe/NiFe layer 642 is inserted in between the Cu spacer 640 and the CoFe free layer. In this embodiment, the NiFe layer 642 acts as an underlayer for formation of a CoFe/Ir/CoFe AP-tab structure.

FIG. 11 illustrates a lead overlaid read head 1100 according to yet another embodiment. This head 1100 is similar to the head 600 shown in FIG. 6, except that the bias layer 660 is formed of CoFe/NiFe/Ta/Ru.

While various embodiments have been described above, it should be understood that they have been presented by way of example only, and not limitation. For example, the structures and methodologies presented herein are generic in their application to all MR heads, AMR heads, GMR heads, spin valve heads, etc. Thus, the breadth and scope of a preferred embodiment should not be limited by any of the above-described exemplary embodiments, but should be defined only in accordance with the following claims and their equivalents.

What is claimed is:

1. A magnetic head, comprising:
a free layer having an active area and tab regions on opposite sides of the active area;
an antiparallel (AP) coupling layer having a thickness of at least about 15 Å formed above the free layer, the AP coupling layer being formed of Ir; and
a bias layer formed above each of the tab portions of the free layer, magnetic moments of the tab regions of the free layer being pinned antiparallel to the magnetic moments of the bias layers.

2. The head as recited in claim 1, wherein the Ir AP coupling layer has a thickness of between about 15 and 25 Å.

3. The head as recited in claim 1, wherein the Ir AP coupling layer has a coupling strength of at least about 0.5 $erg/cm^2$.

4. The head as recited in claim 1, further comprising an AP pinned layer structure below the free layer, the AP pinned layer structure includes at least two pinned layers having magnetic moments that are self-pinned antiparallel to each other, the pinned layers being separated by a second AP coupling layer.

5. The head as recited in claim 4, wherein the pinned layers of the AP pinned layer structure are formed of CoFe.

6. The head as recited in claim 1, wherein the free layer is formed on a layer of Cu.

7. The head as recited in claim 1, wherein the free layer is formed directly on a layer of NiFe.

8. The head as recited in claim 1, wherein the bias layers are formed of materials selected from a group consisting of NiFe, CoFe, Ta, Ru and laminates thereof.

9. The head as recited in claim 1, wherein the free layer and the bias layer both include fcc CoFe.

10. A magnetic head, comprising:
- a free layer having an active area and tab regions on opposite sides of the active area;
- an antiparallel (AP) coupling layer formed above the free layer, the AP coupling layer having a thickness of at least about 15 Å; and
- a bias layer formed above each of the tab portions of the free layer, magnetic moments of the tab regions of the free layer being pinned antiparallel to the magnetic moments of the bias layers.

11. The head as recited in claim 10, wherein the AP coupling layer is formed of Ir, the AP coupling layer extending along the active area of the free layer.

12. The head as recited in claim 10, wherein the AP coupling layer has a thickness of at least 15 Å.

13. The head as recited in claim 10, wherein the AP coupling layer has a thickness of between about 15 and 25 Å.

14. The head as recited in claim 10, wherein the AP coupling layer has a coupling strength of at least about 0.5 erg/cm$^2$.

15. The head as recited in claim 10, further comprising an AP pinned layer structure below the free layer, the AP pinned layer structure includes at least two pinned layers having magnetic moments that are self-pinned antiparallel to each other, the pinned layers being separated by a second AP coupling layer.

16. The head as recited in claim 15, wherein the pinned layers of the AP pinned layer structure are formed of CoFe.

17. The head as recited in claim 10, wherein the free layer is formed on a layer of Cu.

18. The head as recited in claim 10, wherein the free layer is formed directly on a layer of NiFe.

19. The head as recited in claim 10, wherein the bias layers are formed of materials selected from a group consisting of NiFe, CoFe, Ta, Ru and laminates thereof.

20. The head as recited in claim 10, wherein the free layer and the bias layer both include fcc CoFe.

21. A magnetic storage system, comprising:
magnetic media;
- a head for reading from and writing to the magnetic media, the head having a structure as recited in claim 1;
- a write element coupled to the sensor;
- a slider for supporting the head; and
- control unit coupled to the head for controlling operation of the head.

22. A magnetic storage system, comprising:
magnetic media;
- a head for reading from and writing to the magnetic media, the head having a structure as recited in claim 10;
- a write element coupled to the sensor;
- a slider for supporting the head; and
- a control unit coupled to the head for controlling operation of the head.

* * * * *